Patented Jan. 2, 1945

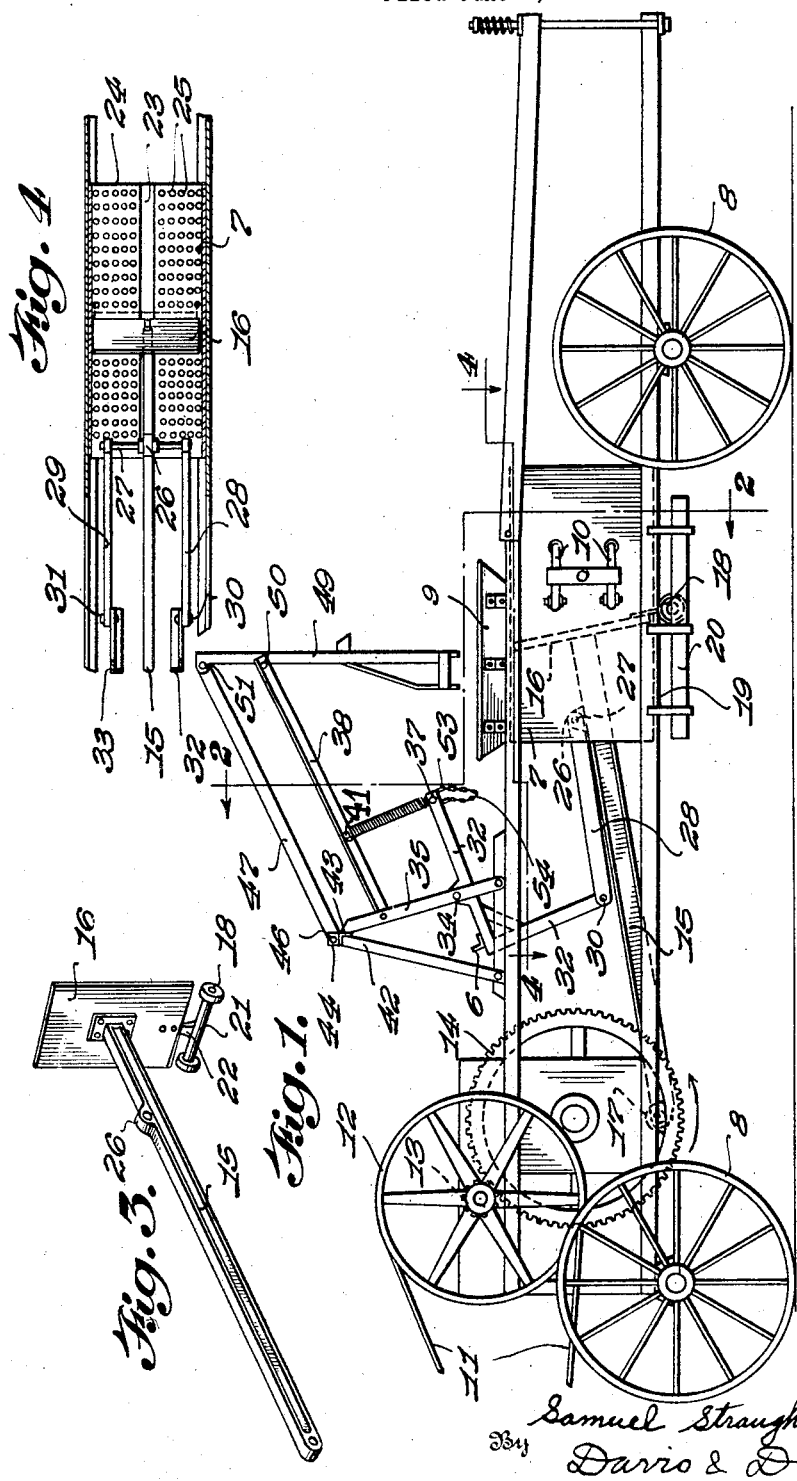

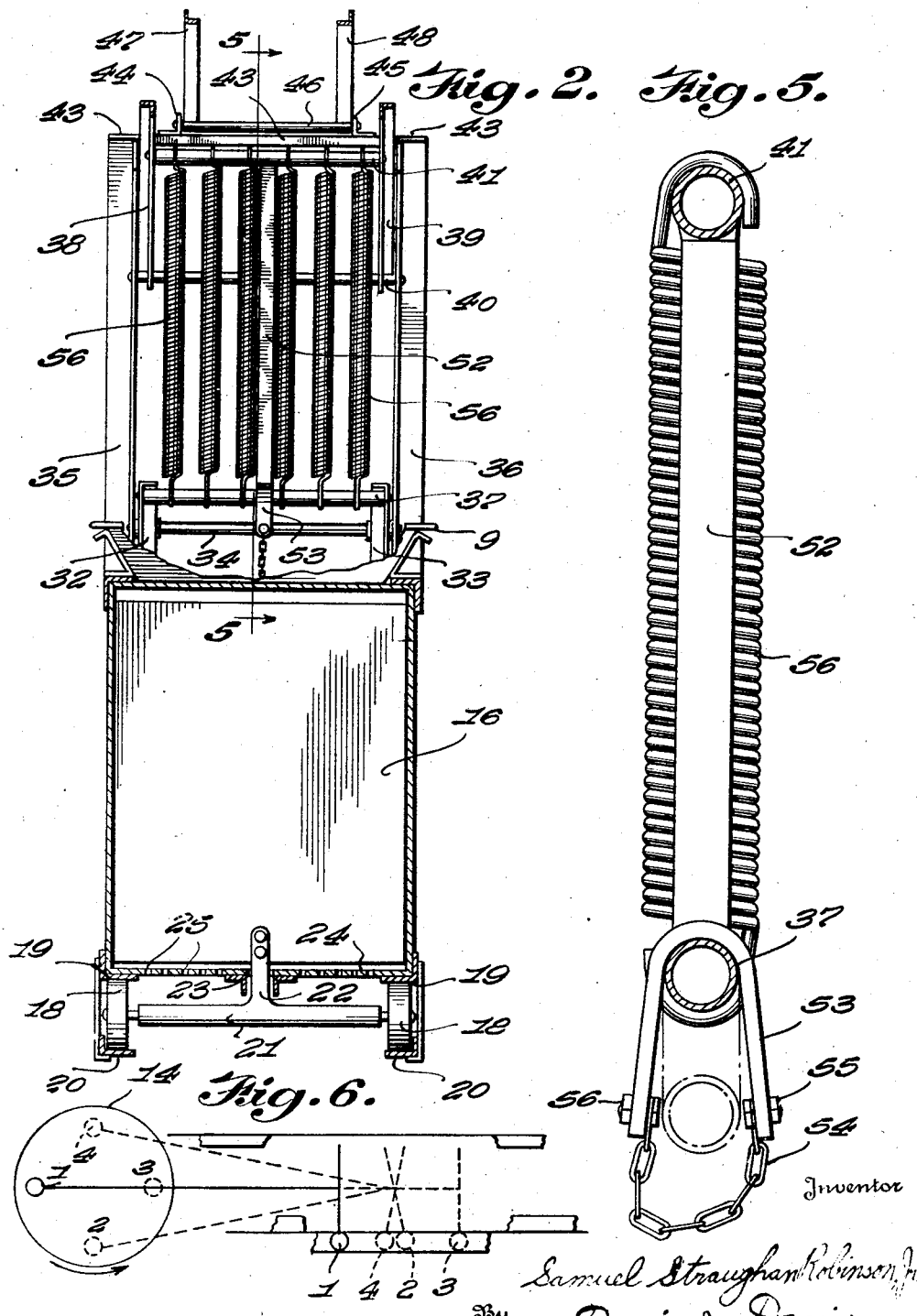

2,366,426

UNITED STATES PATENT OFFICE 2,366,426

BALING PRESS

Samuel Straughan Robinson, Jr., Albany, Ga., assignor to Lilliston Implement Company, Albany, Ga., a corporation of Georgia Application June 9, 1941, Serial No. 397,315

9 Claims. (Cl. 100—25)

This invention relates to improvements in a baling-press and has for an object to provide an improved baler head and baling chamber assembly whereby the friction and wear on the bottom of the baling chamber may be reduced to a minimum. The bottom of the bale chamber of the conventional type of baling press is subject to great wear and friction. Heretofore in the conventional type of baling press, it has been necessary to use a very heavy bottom for the bale chamber to withstand such friction and wear or to replace the worn bottom of the bale chamber at frequent intervals. It is therefore an object of my invention to provide means for preventing the unnecessary wear and friction on the bottom of the bale chamber.

Another object of my invention is to provide an improved and simplified baler head assembly whereby the baler head is caused to operate on the compression stroke so that the lower end of the baler head is further advanced than the upper end thereof, until the very end of the said stroke. Thus the pressure applied by the said baler head is directed into the hay or other material to be baled so as to force the same forwardly and upwardly from the bottom of the baler rather than downwardly, thereby reducing the wear on the bottom of the baler.

It is a further object of my invention to provide rollers attached to the said baler head and mounted on tracks separate from the bottom of the baler in such a manner as to keep the baler head from engaging or wearing the bottom of the baler. The said rollers also are adapted to prevent the baler head from rising in the bale chamber and are further adapted to serve as a pivot for the baler head.

It is a further object of my invention to provide a sturdy and simplified construction to accomplish the foregoing, which will eliminate in so far as possible all unnecessary wearing parts, and a baling press which may be manufactured at low cost and easily and efficiently operated.

Another object of my invention is to provide an improved tramper or feeder bar assembly operably connected to the reciprocating baler head by a spring tension means, whereby upon an obstruction to the tramper the said spring tension means will elongate so as to prevent the breaking or damage to any part of the baler.

Another object of my invention is to provide an improved tension spring assembly for the purpose specified which will be more effective and have a higher percentage yield than the conventional compression spring assembly heretofore used for such release mechanism.

In the compression spring type of release mechanism the force required to cause the compression spring to yield is in proportion to the degree to which it has yielded or been compressed. Thus as the spring is compressed toward a dead position the same will yield less readily and the percentage yield decreases proportionately.

However in the release mechanism shown herein the converse is true. My release mechanism is so constructed that upon an obstruction to the tramper the tension spring elongates or yields and the same yields equally readily as the tension spring continues to elongate within the limits of the release mechanism. Thus in my invention the release mechanism assembly is more effective than the conventional compression type release assembly.

Furthermore it is an object of my invention to provide a release spring assembly for the purpose specified which will in so far as possible eliminate wearing parts such as the slides or guides which are necessary in the conventional compression spring and which parts so often become defective through wear resulting in possible ineffective operation causing damage to the baler upon an obstruction to the tramper.

Other objects and advantages of my invention are set forth in the following description, taken with the accompanying drawings, and the novel features thereof are pointed out in the appended claims. The disclosure, however, is illustrative only, and I may make changes in detail especially in matters of shape, size and arrangement of parts within the principle of the invention to the full extent indicated by the broad and general meanings of the terms in which the appended claims are expressed.

On the drawings:

Figure 1 is a side elevation of a baling press illustrating my invention.

Figure 2 is an enlarged sectional view taken along the line 2—2 of Figure 1 with certain parts broken away.

Figure 3 is a perspective view of the baler head.

Figure 4 is a horizontal sectional view of the baling chamber taken along the line 4—4 of Figure 1.

Figure 5 is an enlarged sectional view of the tension spring assembly taken along the line 5—5 of Figure 2.

Figure 6 is a diagrammatic view illustrating the operation of the baler head.

Similar characters of reference refer to similar parts and portions throughout the several views of the drawings.

In the embodiment of my invention illustrated in Figure 1 there is provided the baling chamber 7 mounted upon the wheels 8 in the conventional manner. The said baling chamber 7 has the hopper 9 of the ordinary type open at the top so that the baling material can be conveniently supplied to the baling chamber. Mounted on the sides of the said baling chamber 7 are the customary bale retainers 10.

The baling press is operated by power transmitted from an engine not shown through belt 11 to the wheel 12 rotatably mounted at one end of the frame of the baling chamber. The said wheel 12 is geared to the large gear wheel 14 by the small gear 13 connected to the said wheel 12. The large gear wheel 14 is rotatably mounted on the frame of the baling chamber and is adapted to revolve in a counterclockwise direction as indicated by the arrow in Figures 1 and 6.

A pitman arm 15 is provided for transmitting power from the driven gear wheel 14 to the baler head 16. The said pitman arm 15 is pivotally connected to the large gear wheel 14 through the medium of an eccentric pin 17 and the said pitman arm 15 is rigidly fastened to the baling head 16 as shown in Figures 1 and 3.

The baling head 16 rides on the rollers 18 as shown in Figures 1 and 2. The said rollers 18 are adapted to move along the tracks 19 and 20. The rollers 18 are rotatably mounted on the axle 21 which is fastened by the stem 22 to the lower end of the baler head 16. The said stem 22 is movably mounted in the slot 23 provided in the bottom 24 of the baling chamber 7.

The bottom 24 of the baling chamber 7 has provided the apertures 25 through which dirt, dust and other fine material may readily sift, thereby lessening the friction and wear on the bottom 24. Further it will be readily seen that as the wheel 14 revolves in the direction shown by the arrow in Figures 1 and 6 the baler head on the compression stroke will be directed into the baling material in such a manner as to force the said material upward and forward. This is shown graphically in Figure 6. Thus with the wheel 14 in the position 1 the pitman will be in a horizontal position and the forward surface of the baler head 16 will be vertical preparatory to beginning the compression stroke. As the wheel 14 revolves on the compression stroke from position 1 to position 2 the forward surface of the baler head will vary from the vertical position in proportion to the variance of the pitman arm from a horizontal position. In the position indicated in Figure 6 by the numeral 2 the lower end of the baler head 16 will be further advanced than the upper end of the baler head 16. As the wheel 14 continues to revolve on the compression stroke from position 2 to position 3 the pitman arm will vary from the position at an acute angle to the horizontal position and the forward surface of the baler head will be adjusted so that at the end of the compression stroke the forward surface will be in a vertical position. Upon the wheel 14 revolving on the return stroke to the position indicated by numeral 4 the forward surface of the baler head 16 is directed downwardly and upon the wheel 14 revolving to the position 1 the forward surface of the baler head 16 will once again resume a vertical position.

It will thus be seen that there is imparted to the pitman arm 15 not only a reciprocating movement but also a swinging movement in the vertical plane which causes the baler head to be pivoted on the rollers 18.

It will be readily seen that by directing the baler head on the compression stroke forward and upward into the baling material less wear will result on the bottom of the baling chamber.

Further it will also be readily seen, since the baler head does not drag along the bottom of the baling chamber as in the conventional type, but is rather mounted on rollers which move on tracks separate and apart from the baling chamber, that less wear on the bottom of the baling chamber will result than in the conventional type of baling press.

Further it will be readily seen that the pivoting and moving parts which would be subject to wear have through my combination been reduced to a minimum.

Further pivotally attached to the pitman arm 15 at 26 is the rod 27 having pivotally fastened at the opposite ends thereof the links 28 and 29 as shown in Figure 4.

The links 28 and 29 are pivotally connected at 30 and 31 to the lever arms 32 and 33 respectively. The lever arms 32 and 33 are rigidly connected by the angle bar 6 and the rod 34. The said rod 34 is pivotally connected to the standards 35 and 36 mounted on the baling chamber frame as shown in Figures 1 and 2 whereby the lever arms 32 and 33 may be conveniently pivoted.

Mounted at the upper end of the lever arms 32 and 33 and connecting the same is the bar 37, the purpose of which will be explained hereinafter.

Further the angle bars 38 and 39 are connected at one end by the bar 40 which is in turn pivoted to the standards 35 and 36 at a point above the pivotal connection of the bars 32 and 33 to the said standards.

Further connecting the angle bars 38 and 39 at a position intermediate the opposite ends thereof is the bar 41 the purpose of which will be explained.

Besides the standards 35 and 36, a second pair of supporting standards 42 are provided having the lower end thereof secured to the frame of the baling chamber and the upper end welded or fastened in any convenient manner to the angle bar 43. The angle bar 43 connects the upper ends of the said supporting standards 42 and is welded or connected in any convenient manner to the upper ends of the standards 35 and 36 connecting the same and fastening the standards 35 and 36 as shown in Figures 1 and 2.

Mounted on the angle bar 43 are the vertically projecting members 44 and 45 between which there is rotatably mounted the pivotal rod 46. The angle bars 47 and 48 at the lower end thereof are fastened to the pivotal rod 46. The said bars 47 and 48 extend parallel to and above the respective bars 38 and 39. The said bars 47 and 48 are pivotally attached at the upper ends thereof by the member 51 at the upper end of the tramper or feeder bar 49. Also the angle bars 38 and 39 extending parallel to and spaced apart from the bars 47 and 48 are pivotally connected by the member 50 to the tramper or feeder bar 49 as shown in Figure 1.

The bars 38 and 39 and the bars 47 and 48 are adapted to guide the feeder bar or tramper.

Secured to the bar 41 by welding or other convenient means is the downwardly extending reciprocating bar 52 shown in Figure 2 and in detail in Figure 5. Attached at the lower end of the said bar 52 is the inverted U shaped strap 53 adapted to fit over the bar 37 and releasably engage the same. There is further provided the chain member 54 attached at the opposite ends thereof by the nut and bolt members 55 and 56 to the opposite ends of the said strap 53. The said strap 53 and chain member 54 thereby surround the bar 37, but permit free movement therein. The chain member 54 serves as a convenient means for preventing the rod 37 from becoming displaced from the strap 53. Further there are provided the spring tension members 56 attached at opposite ends to the bars 41 and 37. The tendency of the spring tension means 56 attached between the bars 41 and 37 is to hold the bar 37 is engaging relationship with the strap member 53 of the reciprocating bar 52.

Thus, upon the arm 37 being directed upwardly by the pivotal action of the lever arms 32 and 33 due to forward movement of the pitman arm 15, the bar 37 will force the bar 52 upwardly and cause the bar 38 to likewise be pivoted upwardly. This action will in turn cause the feeder bar 49 to be pivoted upwardly with the pivotal guide bars 47 and 48.

Further, upon the arm 37 being directed downwardly by the pivotal action of the lever arms 32 and 33 due to the rearward movement of the pitman arm 15, the spring tension members 56 will transmit this movement to the bar 41 which under the force of gravity and the tension of the said spring members 56 will be projected downwardly causing the downward movement of the feeder bar 49 into the baling chamber 7 through open hopper 9.

It would be readily apparent that upon a sudden shock or obstruction to the feeder bar the same will be taken up by the spring tension means 56. The said spring tension means provided herein permits all desirable release in the case of any obstruction across the hopper. The spring in such case yielding sufficiently to permit the complete revolution of the gear wheel 14 without damage to any part of the tramper or baling press.

Furthermore, the spring tension means provided herein is adapted to yield equally efficiently within the limits required rather than yielding less readily as the spring continues to yield as in the conventional compression spring.

Furthermore, in the tension spring mounting provided herein wearing parts such as slides and guides provided in the conventional compression spring assemblies are not necessary for the proper operation of my invention, thereby reducing loss by friction and wear to a minimum.

Having thus described my invention, what I claim as my invention and desire to secure by Letters Patent is:

1. In a baling press of the class including a baling chamber, a baler head mounted in the said chamber, a pitman connected to the said baler head, means for reciprocally moving the said pitman, a pivoted lever arm, a guide arm pivotally mounted above the said lever arm, a feeder bar connected to the said guide arm and means connecting the said lever arm to the said pitman; the improvement comprising a reciprocating bar fastened to one of the said arms and the said reciprocating bar adapted to releasably engage the other of the said arms, spring tension means connected between the said guide arm and the said lever arm, and adapted to hold the said reciprocating bar and the said other arm in engaging relationship under spring tension, whereby upon the forward movement of the said pitman the said feeder bar will be moved upward and upon the rearward movement of the said pitman the said feeder bar will move downward in such a manner as to force the baling material downwardly into the baling chamber and whereby upon an obstruction to the downward movement of the feeder bar the reciprocating bar will disengage the said other arm under spring tension.

2. In a baling press of the class including a baling chamber, a baler head mounted in the said chamber, a pitman arm connected to the said baler head and means for reciprocally moving the said pitman arm, a pivoted lever arm, a link member connecting the lower end of the said lever arm to the said pitman arm, a guide arm pivotally mounted above the said lever arm, and the said guide arm connected to a feeder bar; the improvement comprising a reciprocating bar having one end fastened to the said guide arm, an inverted U shaped strap fastened at the other end of the said reciprocating bar, means for biasing the reciprocating bar in such a manner as to cause the inverted U shaped strap to releasably engage the upper end of the said lever arm, whereby upon the forward movement of the said pitman arm the said feeder bar will be moved upward and upon the rearward movement of the said pitman arm the said feeder bar will move downward in such a manner as to force the baling material downwardly into the baling chamber and upon an obstruction to the downward movement of the feeder bar the said U shaped strap will disengage the upper end of the said lever arm against the force of the biasing means aforesaid.

3. In a baling press of the class including a baling chamber, a baler head positioned in the said chamber, a pitman arm connected to the said baler head and means for reciprocally moving the said pitman arm, a pivoted lever arm, a link member connecting the lower end of the said lever arm to the said pitman arm, a guide arm pivotally mounted above the said lever arm, and the said guide arm connected to a feeder bar; the improvement comprising a reciprocating bar having one end fastened to the said guide arm, an inverted U shaped strap fastened at the other end of the said reciprocating bar, the said inverted U shaped strap adapted to releasably engage the upper end of the said lever arm, a plurality of coiled springs connected at the upper ends thereof to the said guide arm and the said coiled springs connected at the lower ends thereof to the upper end of the said lever arm in such a manner as to hold the upper end of the said lever arm in engaging relationship with the said inverted U shaped strap under spring tension, and a chain member connected to the opposite ends of the said inverted U shaped strap in such a manner as to limit upon an obstruction to the feeder bar the amount of free downward movement of the upper end of the said lever arm away from said U shaped strap.

4. In a feeder mechanism for a baling press the combination, comprising, an actuating lever arm, a feeder bar, a reciprocatory bar operatively connecting said actuating lever arm and the said feeder bar for movement of the said feeder bar in one direction, and an extensible spring connected between the said lever arm and the said feeder bar in such a manner as to operatively connect the said lever arm and the said feeder bar for movement in an opposite direction, and the said extensible spring adapted to elongate upon an obstruction to the said feeder bar so as to release the said feeder bar from operative relation with the said actuating lever arm.

5. In a feeder mechanism for a baling press of the type including an actuating lever arm and a feeder bar; the improvement comprising a reciprocating bar having one end mechanically connected to the said feeder bar, an engaging means positioned at the other end of the said reciprocating bar for releasably engaging the said actuating lever arm for movement of the said feeder bar in one direction, tension means adapted to operatively connect the said actuating lever arm and the said reciprocating bar for movement of the said feeder bar in another direction, and the said engaging means of the said reciprocating bar adapted to release the said reciprocating bar from engagement with the said actuating lever arm upon an obstruction to movement of the said feeder bar in the said other direction.

6. In a feeder mechanism for a baling press of the type including an actuating lever arm and a feeder bar; the improvement comprising a reciprocating bar having one end attached to the said feeder bar, an engaging means provided at the other end of the said reciprocating bar, the said engaging means adapted to releasably engage the said actuating lever arm for upward movement of the said feeder bar, a tension spring connected between the said actuating lever arm and the said feeder bar, and the said tension spring adapted to hold the said actuating lever arm and the said reciprocating bar in operative relation for downward movement of the said feeder bar, and the said tension spring adapted to elongate upon an obstruction to the said downward movement of the said feeder bar so as to permit the release of the said reciprocating bar from operative relation with the said actuating lever arm.

7. In a baling press of the class including a baling chamber, a baler head mounted in the chamber, power means for reciprocably moving the baler head, a feeder bar and a guide arm for moving said feeder bar into the baling chamber so as to force baling material therein; the improvement comprising means for mechanically connecting said guide arm to said power means including a projecting actuating rod driven by said power means, a reciprocating bar having one end affixed to the guide arm, an inverted U shaped strap affixed at the other end of said reciprocating bar, said inverted U shaped strap extending transverse said actuating rod for releasably engaging said actuating rod within the looped portion thereof, a plurality of coiled tension spring members connected at one end to said guide arm and at the opposite end to said actuating rod for releasably holding said inverted U shaped strap in engaging relation with said actuating rod, whereby upon an obstruction to movement of said feeder bar into said baling chamber said coiled tension spring members may elongate under the force of said actuating rod driven by said power means so that said actuating rod may move freely in disengaging relation to said U shaped strap.

8. In a mechanism of the type including a driving member and a driven member; the improvement comprising releasable means for operatively connecting said driving and driven members including a reciprocating bar having an end thereof affixed to one of said members, a U shaped strap mounted at the other end of said reciprocating bar, a rod projecting from the other of said members and extending transverse said U shaped strap for releasable engagement by said U shaped strap for causing movement of said driven member in response to movement of said driving member, a plurality of coiled tension springs positioned at opposite sides of said reciprocating bar, one end of said coiled tension springs connected to one of said members, and the other end of said coiled tension springs connected to said rod for releasably holding said U shaped strap and said rod in engaging relation under tension in such a manner that upon movement of said driving members in one direction said driving and driven members may be operatively disconnected by elongation of said coiled tension springs upon an obstruction to movement of said driven member in said one direction.

9. In a baling press the combination, comprising, a baling chamber, a feeder bar, and an actuating element for moving said feeder bar in and out of said baling chamber, a reciprocating element operably connecting said actuating element and said feeder bar, spring tension means connecting the feeder bar and said actuating element, said reciprocating element extending between said actuating element and said feeder bar in operable relation therewith so that said feeder bar may be motivated in response to said actuating element, and said reciprocating element upon an obstruction to movement of the feeder bar into said baling chamber permitting the release of said feeder bar from operative relation with said actuating element.

SAMUEL STRAUGHAN ROBINSON, Jr.